United States Patent
Xu et al.

(10) Patent No.: US 7,167,979 B2
(45) Date of Patent: Jan. 23, 2007

(54) INVOKING MUTUAL ANONYMITY BY ELECTING TO BECOME HEAD OF A RETURN PATH

(75) Inventors: Zhichen Xu, Sunnyvale, CA (US); Li Xiao, Williamsburg, VA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 924 days.

(21) Appl. No.: 10/114,071

(22) Filed: Apr. 3, 2002

(65) Prior Publication Data

US 2003/0191933 A1   Oct. 9, 2003

(51) Int. Cl.
*H04L 9/00* (2006.01)

(52) U.S. Cl. .................. 713/153; 713/163; 713/171; 709/238; 709/209; 709/203; 709/230

(58) Field of Classification Search ............ 713/163, 713/171, 153; 709/203, 238–242, 204–205, 709/209, 230, 201
See application file for complete search history.

(56) References Cited

U.S. PATENT DOCUMENTS

| | | | |
|---|---|---|---|
| 6,600,724 B1 * | 7/2003 | Cheng ................... | 370/256 |
| 6,633,544 B1 * | 10/2003 | Rexford et al. ......... | 370/238 |
| 6,675,205 B1 * | 1/2004 | Meadway et al. ....... | 709/219 |
| 6,711,152 B1 * | 3/2004 | Kalmanek et al. ...... | 370/351 |
| 6,728,214 B1 * | 4/2004 | Hao et al. ............... | 370/241 |
| 6,798,765 B1 * | 9/2004 | Larsson .................. | 370/351 |
| 6,879,594 B1 * | 4/2005 | Lee et al. ................ | 370/408 |
| 6,973,081 B1 * | 12/2005 | Patel ....................... | 370/390 |
| 2002/0165979 A1 * | 11/2002 | Vincent .................. | 709/239 |
| 2003/0131129 A1 * | 7/2003 | Becker et al. .......... | 709/238 |

OTHER PUBLICATIONS

Li et al. "A Mutual Anonymous Peer-to-peer Protocol Design", Proceedings of the 19th IEEE International Parallel and Distributed Processing Symposium, 2005.*
Li et al., "Location Awareness in Unstructured Peer-to Peer Systems", IEEE Transactions on Parallel and Distributed Systems, vol. 16, No. 2, Feb. 2005. pp. 163-174.*
Li et al., "Fast and low-cost search schemes by exploiting localities in P2P networks", Journal of Parallel and Distributed Computing, 2005, pp. 729-742.*
Zhichen et al., "On Reliable and Scalable Peer-to-peer Web Document Sharing", Proceedings of 2002 Internal Parallel and Distributed Proceeding Symposium, 2002.*
Prinkey, "An Efficient Scheme for Query Processing on Peer-to_Peer", http://Aeolusres.homestead.com/files, 2001.*
Clarke et al., "Freenet: A distributed Anonymous Information Storage and Retrieval System", Proceedings of the ICSI Worshop on Design Issues in anonymity and Unobservability, Berkeley, CA 2000. International Computer Science Institute.*

* cited by examiner

*Primary Examiner*—Gilberto Barron, Jr.
*Assistant Examiner*—Tongoc Tran
(74) *Attorney, Agent, or Firm*—Richard P. Lange

(57) ABSTRACT

In a method of invoking mutual anonymity, electing to become a head of a return path in response to receiving a request for information. The information is received at the head of the return path. The information is then forwarded to a peer that transmitted the request.

45 Claims, 7 Drawing Sheets

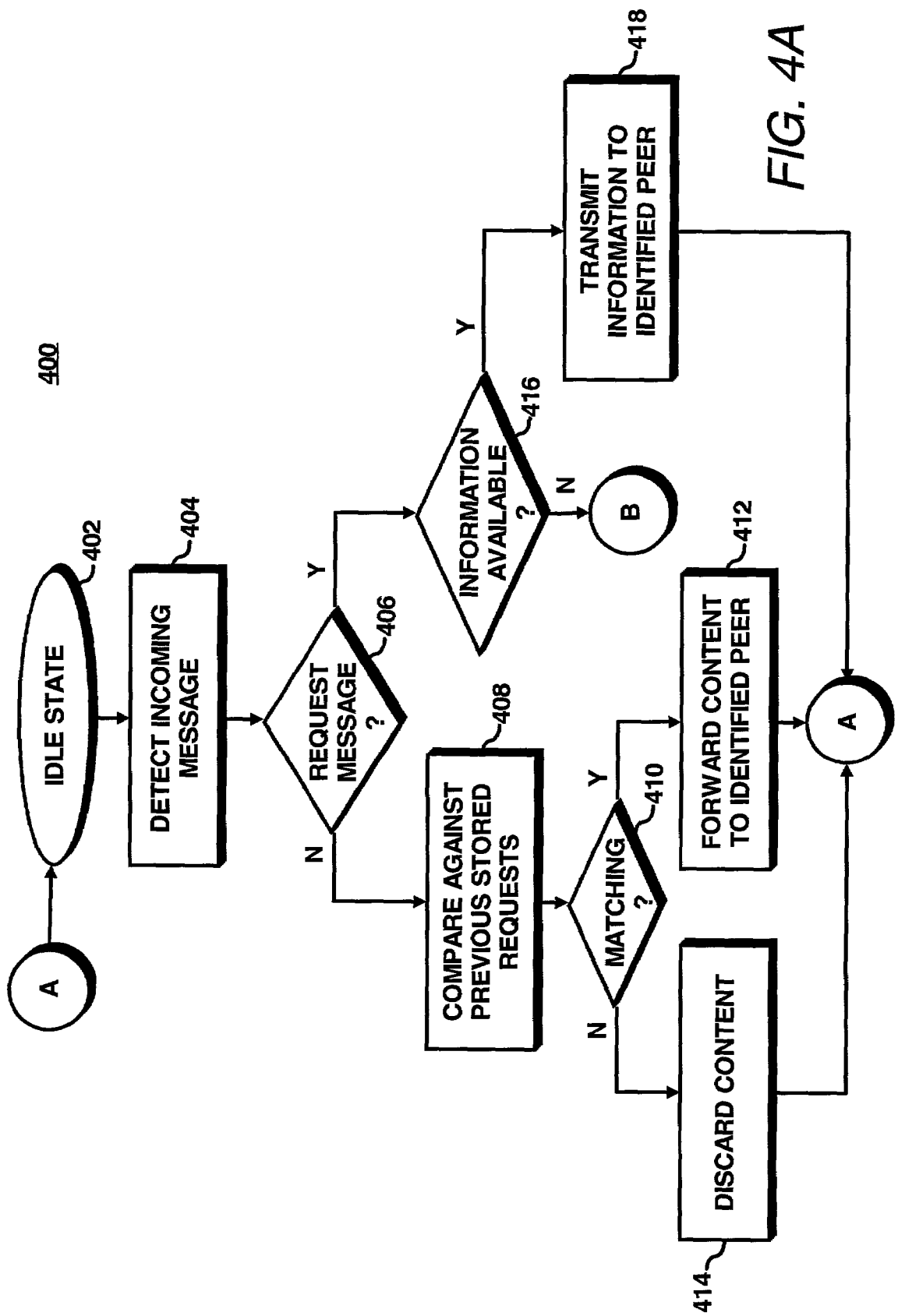

INVOKING MUTUAL ANONYMITY BY ELECTING TO BECOME HEAD OF A RETURN PATH

FIELD OF THE INVENTION

This invention relates generally to network systems. More particularly, the invention relates to invoking mutual anonymity in a network system.

DESCRIPTION OF THE RELATED ART

A conventional system of peers (or network nodes) interconnected via a network provides a relatively convenient means of exchanging information between the peers. However, conventional network systems may be vulnerable to malicious users. For example, malicious users may determine the types of information stored at specific peers by monitoring the network traffic. This may be problematic if one or more of the peers are sources of sensitive information.

Most existing anonymity techniques are for client/server models, which only hide the identities of the requestor (clients) from the servers. Some recent techniques have addressed the problem of enforcing the mutual anonymity between a requestor and responder in a peer-to-peer ("P2P") environment. One technique to substantially increase privacy in a P2P network system is to configure each peer such that it only knows a limited number of other peers. Accordingly, the identity of each peer is hidden from the other network nodes. However, this technique may suffer from some drawbacks and disadvantages. For instance, a peer may have to blindly broadcast its anonymous request for information to a large number of the peers. As a result, each peer receiving the request may search for the requested information. A majority of the peers may not have the requested information but are still required to process the request, and thereby, waste computational time.

Another technique to substantially increase privacy in a conventional network system is to use a trusted third party to hide the identity of the peer. However, this approach also has its own drawbacks and disadvantages. For example, the trusted third party may become a bottleneck for network traffic since the requests for information are funneled through the trusted third party. As a result, the overall performance of the conventional network system may be substantially reduced.

SUMMARY OF THE INVENTION

An embodiment of the present invention pertains to a method of invoking mutual anonymity. The method includes electing to become a head of a return path in response to receiving a request for information and receiving the information at the head of the return path. The method also includes forwarding the information to a peer that transmitted the request.

Another embodiment of the invention relates to a method of increasing privacy. The method includes forwarding a request for information among a plurality of peers and selecting a peer from the plurality of peers as a head of a return path. The method also includes forwarding the information to the peer from another peer containing the information.

Yet another embodiment of the invention pertains to an apparatus for increasing privacy. The apparatus includes means for forwarding a request for information among a plurality of peers and means for selecting a peer from the plurality of peers as a head of a return path. The apparatus also includes means for forwarding the information to the peer from another peer containing the information.

Yet another embodiment of the invention relates to a system for invoking mutual anonymity. The system includes a network, a plurality of peers and a peer privacy module. The peer privacy module is configured to be stored and executed on each peer of the plurality of peers. The peer privacy module is also configured to forward a request for information among a plurality of peers through the network and to select a peer from the plurality of peers as a head of a return path. The peer privacy module is further configured to forward the information to the peer from another peer containing the information.

BRIEF DESCRIPTION OF THE DRAWINGS

Various features of the present invention can be more fully appreciated as the same become better understood with reference to the following detailed description of the present invention when considered in connection with the accompanying figures, in which:

FIGS. 4A–C collectively illustrate an exemplary flow diagram according to yet another embodiment of the invention.

DETAILED DESCRIPTION OF A PREFERRED EMBODIMENT

Figure 1:
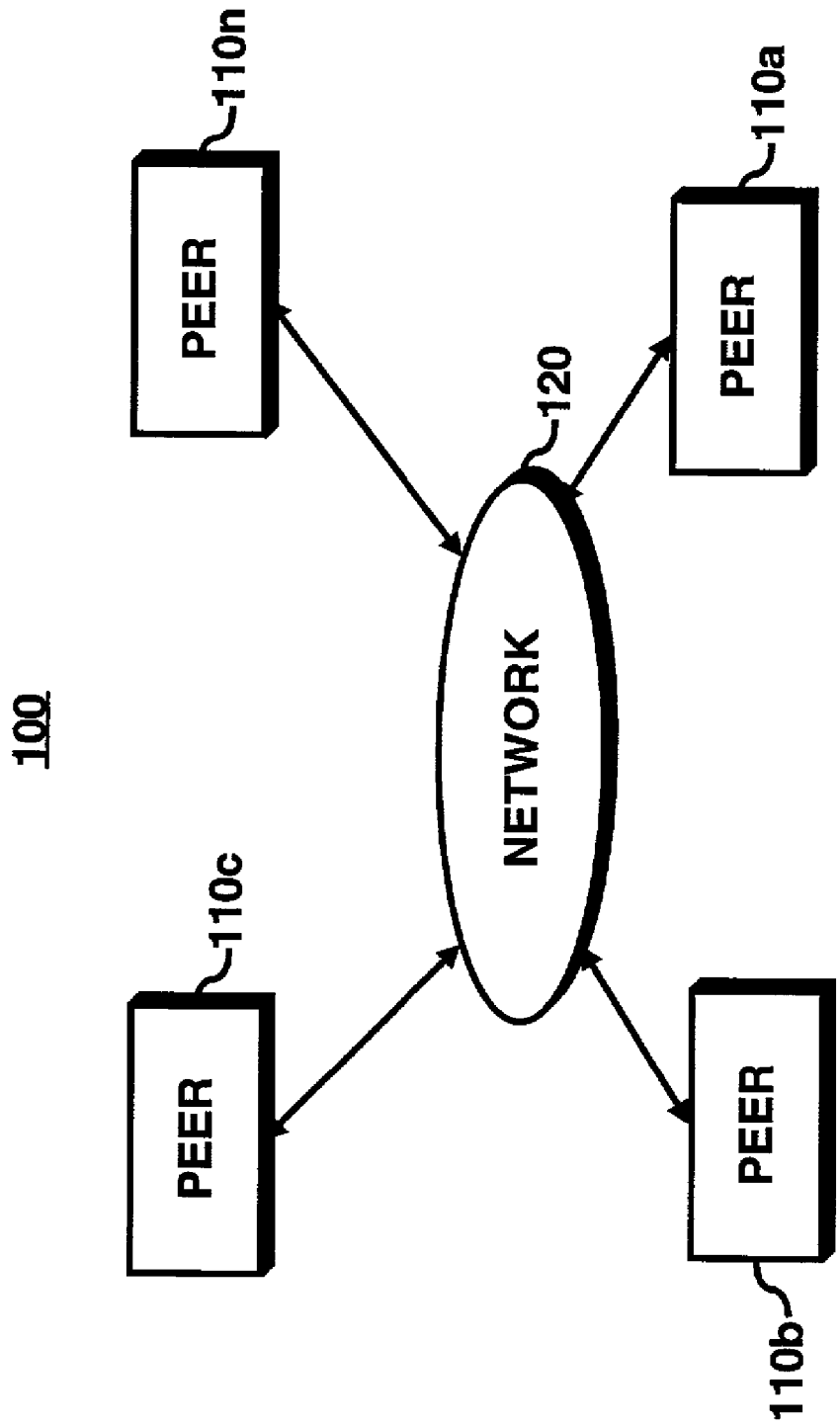
FIG. 1 illustrates an exemplary system where an embodiment of the invention may be practiced.

For simplicity and illustrative purposes, the principles of the present invention are described by referring mainly to exemplary embodiments thereof. However, one of ordinary skill in the art would readily recognize that the same principles are equally applicable to, and can be implemented in, all types of network systems, and that any such variations do not depart from the true spirit and scope of the present invention. Moreover, in the following detailed description, references are made to the accompanying figures, which illustrate specific embodiments in which the present invention may be practiced. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

In accordance with an embodiment of the present invention, a peer privacy module may be utilized to increase the privacy of peers exchanging information in a network system. More particularly, the network system comprises a plurality of peers and a network providing a channel for communication among the peers. In the network system, a requestor peer may request information from another peer by forming (or instantiating) a request message. The requester peer may then forward the request message to a randomly selected peer. The selected peer may return a retrieval message in response to receipt of the request message.

A peer privacy module executing on a peer may be configured to determine whether an incoming message is a retrieval message or a request message. More particularly, the peer privacy module may compare the format of the incoming message with a retrieval message type and a request message type. If the incoming message is a retrieval message, the peer privacy module may be configured to compare the incoming message against any previously stored request messages.

If there is a match between the incoming message and any of the previously stored request messages, the peer privacy module may be configured to retrieve a return peer from the previously stored request message. The peer privacy module may then forward the incoming message to the identified peer. Otherwise, if a match does not exist between the incoming message and any of the previously stored request messages, the peer privacy module may discard the incoming message.

Otherwise, if the peer privacy module determines that the incoming message is a request message, the peer privacy module may be configured to determine if the requested information is located in the receiving peer. For example, the receiving peer may have a cache that stores files, where the files are made available for sharing. If the information is available on the receiving peer, the peer privacy module may be configured to identify the peer that transmitted the request message. The peer privacy module may then transmit the requested information to the identified peer. Otherwise, if the information is not available on the receiving peer, the peer privacy module may be configured to store the received request message in a location. For instance, the location may be in an associated persistent storage device associated with the peer privacy module.

The peer privacy module may be further configured to elect whether to become a head of a return path for the requested information, i.e., when the requested information located, the provider peer forwards the requested information to the head of the return path. If a receiving peer elects to become the head of the return path, the peer privacy module may be configured to reformat the request message to include an indication that the receiving peer has elected to become the head of the return path, e.g., the message format may include $\{r, head:p_i\}$. Subsequently, the peer privacy module may be configured to determine whether to broadcast the reformatted request message. More particularly, if the reformatted request message is to be broadcasted, the peer privacy module may be configured to mark the reformatted message with an indicator, e.g., a bit, a field, etc., that indicates that the reformatted message is not to be transmitted again. The peer privacy module may then transmit the marked request message to the rest of the peers. If the reformatted request message is not to be broadcasted, the peer privacy module may select a peer at random and forward the reformatted request message to the identified peer.

Otherwise, if the receiving peer does not elect to become the head of the return path, the peer privacy module may be configured to check the format of the request format. If the request message includes an indication that the request message is not in the head of the return path format, the peer privacy module may be configured to reformat the request message to indicate that the receiving peer is the return destination. The peer privacy module may then determine whether to broadcast as detailed herein above. Otherwise, if the request message format includes a head of the return path indication, the peer privacy module may be configured to proceed to the determination of whether to broadcast as detailed herein above.

FIG. 1 illustrates an exemplary block diagram of a system 100 where an embodiment of the present invention may be practiced. It should be readily apparent to those of ordinary skill in the art that the system 100 depicted in FIG. 1 represents a generalized illustration and that other components may be added or existing components may be removed or modified without departing from the spirit or scope of the present invention.

As shown in FIG. 1, the system 100 includes a plurality of peers 110a . . . 110n. The peers 110a . . . 110n may be configured to exchange information among themselves and with other network nodes over a network 120. The peers 110a . . . 110n may be computing platforms (e.g., personal digital assistants, laptop computers, workstations, and other similar devices) that have a network interface. The peers 110a . . . 110n may each be further configured to execute an application software program that provides the capability to share information (e.g., files, data, applications, etc.) in a peer-to-peer manner. Examples of a peer-to-peer software applications are KAZAA, NAPSTER, MORPHEUS, or other similar peer-to-peer applications.

The network 120 may be configured to provide a communication channel among the peers 110a . . . 110n. The network 120 may be implemented as a local area network, wide area network or a combination thereof. The network 120 may implement wired protocols such as Ethernet, token ring, etc., wireless protocols such as Cellular Digital Packet Data, Mobitex, IEEE 801.11b, Wireless Application Protocol, Global System for Mobiles, etc., or a combination thereof.

According to one embodiment of the present invention, a user of the peer 110a, as a requester, may request information (e.g., a file). The peer 110a may select a peer, e.g., 110b, to send a request message that may include a reference, e.g., a uniform resource locator, to requested information. The peer 110a may encrypt the request with the public key of the selected intermediary peer, e.g., 110b. The selected intermediary peer, e.g., 110b, may receive the request message. If the selected intermediary peer stores, e.g., in a cache, a copy of the requested information, the selected intermediary peer forwards the information to the requestor peer, e.g., 110a.

If the selected intermediary peer does not store a copy of the requested information, the selected intermediary peer stores the request. The selected intermediary peer may elect itself as a head of a return path, i.e., the requested information will return directly to the head of the returning path when located, based on a shortcut probability. The return path may include multiple peers that elected to become head of the return path. As such, the requested information would be forward from a provider peer to the most recent head of the path to the next head of the path and so on to the requestor peer. As such, the shortcut probability may be utilized to control the length of the returning path starting from the most recent peer that elected to become head of the path to the requesting peer.

When the selected intermediary peer elects to be the head of the return path, the request message may be reformatted to include an indication of the selection. For example, the request message may take the form of $\{r, head:p_i\}$. If the selected intermediary peer does not elect to become the head of the returning path, the selected intermediary peer may change the request message to include an indication, e.g., $\{r,$ $p_i$}, that it should be included in the return path for the requested information if the request message was in the form of {r, $p_{i-1}$}.

Subsequently, the selected intermediary peer may determine whether to broadcast the reformatted request message or to forward the request message to a selected next intermediary peer. If the selected intermediary peer elects to broadcast, the request message is marked with an indication that the request message is not to be broadcasted again to prevent duplication.

In accordance with another embodiment of the present invention, an intermediary peer, e.g., 110b, may receive a retrieval message from a provider peer or be forwarded the retrieval message from another intermediary peer. The retrieval message may include the requested information from the provider peer. The selected intermediary peer may compare the retrieval message with any previously saved requests that have not been discarded. If a previous saved request matches the retrieval message, the retrieval message is forwarded to the peer identified in the previous saved request. Otherwise, the retrieval message may be discarded to avoid duplicated messages in the network. Accordingly, a response path may be shorter than a requesting path because a peer who receives the request and has the content will send the content directly to the last peer who has elected itself in the requesting path. Moreover, duplicate responses may be discarded relatively quickly, thereby reducing network overhead.

Figure 2:
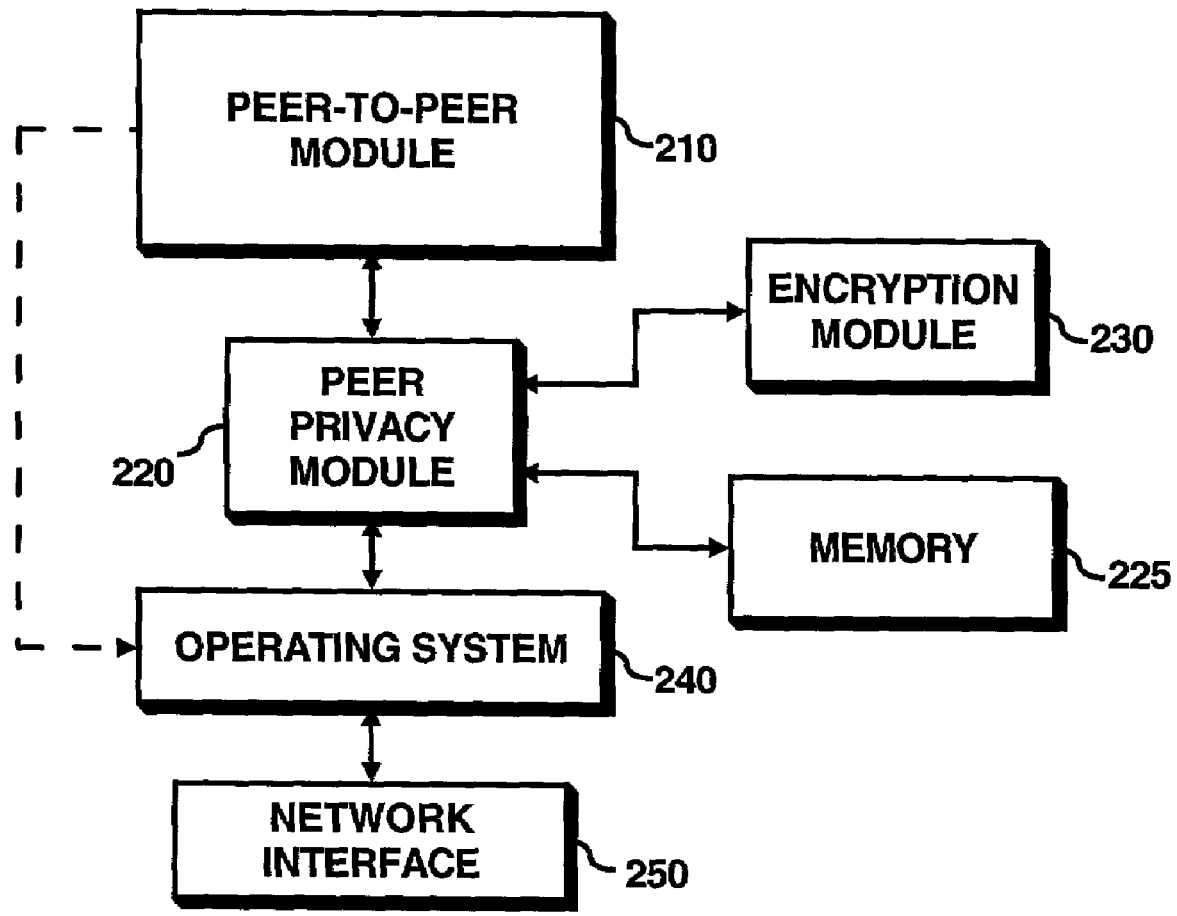
FIG. 2 illustrates an exemplary architecture for a peer in the system shown in FIG. 1 in accordance with one embodiment of the invention.

FIG. 2 illustrates an exemplary architecture 200 for a peer in the system 100 shown in FIG. 1 in accordance with an embodiment of the present invention. It should be readily apparent to those of ordinary skill in the art that the architecture 200 depicted in FIG. 2 represents a generalized schematic illustration and that other components may be added or existing components may be removed or modified without departing from the spirit or scope of the present invention. Moreover, the architecture 200 may be implemented using software components, hardware components, or combinations thereof.

As shown in FIG. 2, the architecture 200 may include a peer-to-peer module 210, a peer privacy module 220, a memory 225, an encryption module 230, an operating system 240 and a network interface 250.

The peer-to-peer module 210 may be configured to provide the capability to a user of a peer to share information with another peer, i.e., each peer may initiate a communication session with another peer. The peer-to-peer module 210 may also be configured to determine which peers are valid. The validity information of the other peers in the system 100 may be made available to the peer privacy module 220.

The peer-to-peer module 210 may be a commercial off-the-shelf application program, a customized software application or other similar computer program. The peer-to-peer module 210 may be implemented by such programs such as KAZAA, NAPSTER, MORPHEUS or other similar peer-to-peer applications. Alternatively, the peer-to-peer module 210 may be configured to directly interface with the operating system 240.

The peer privacy module 220 may be configured to monitor an interface between the peer-to-peer module 210 and the operating system 240. The peer privacy module 220 may also be configured to substantially protect the identity of the peer when the peer requests information from another peer by utilizing the peer-to-peer module 210. The peer privacy module 220 may be implemented as a software program, a utility, a subroutine, or other similar programming entity. In this respect, the peer privacy module 220 may be implemented using software languages such as C, C++, JAVA, etc. Alternatively, the peer privacy module 220 may be implemented as an electronic device utilizing an application specific integrated circuit, discrete components, solid-state components or a combination thereof.

The memory 225 may be a storage device, e.g., a cache, disk drive, etc., configured to provide storage of information such as shared data, request messages, retrieval messages, etc. The peer privacy module 220 may be further configured to interface with an encryption module 230. The encryption module 230 may be configured to provide encryption and decryption services to the peer privacy module 220. For example, the encryption module 230 may generate encryption keys, decrypt encrypted information, etc. The encryption module 230 may use asymmetric or symmetric encryption algorithms. Each peer privacy module 220 may have an encryption key pair, a public and private (or complementary) key. The public key is distributed to the other peers. When the other peers require a secure means of transferring information to the peer privacy module 220, they may encrypt the information with the public key. The peer privacy module 220 may use the private key to decrypt the encrypted information, thus substantially increasing security for information exchanges.

The peer privacy module 220 may be further configured to interface with the operating system 240. More specifically, the peer privacy module 220 may be interfaced with the operating system 240 through an application program interface (API, not shown). The operating system 240 may be configured to manage the software applications, data and respective hardware components (e.g., displays, disk drives, etc.) of a peer. The MICROSOFT WINDOWS family of operating systems, UNIX, HEWLETT-PACKARD HP-UX, LINUX, RIM OS, and other similar operating systems may implement the operating system 240. Alternatively, the peer-to-peer module 210 may be directly interfaced with the operating system 240 where the peer privacy module 220 is monitoring the API.

The operating system 240 may be further configured to couple with the network interface 250 through a device driver (not shown). The network interface 250 may be configured to provide a communication port for the respective peer over the network 120 (shown in FIG. 1). The network interface 250 may be implemented using a network interface card, a wireless interface card or other similar input/output device.

Figure 3:
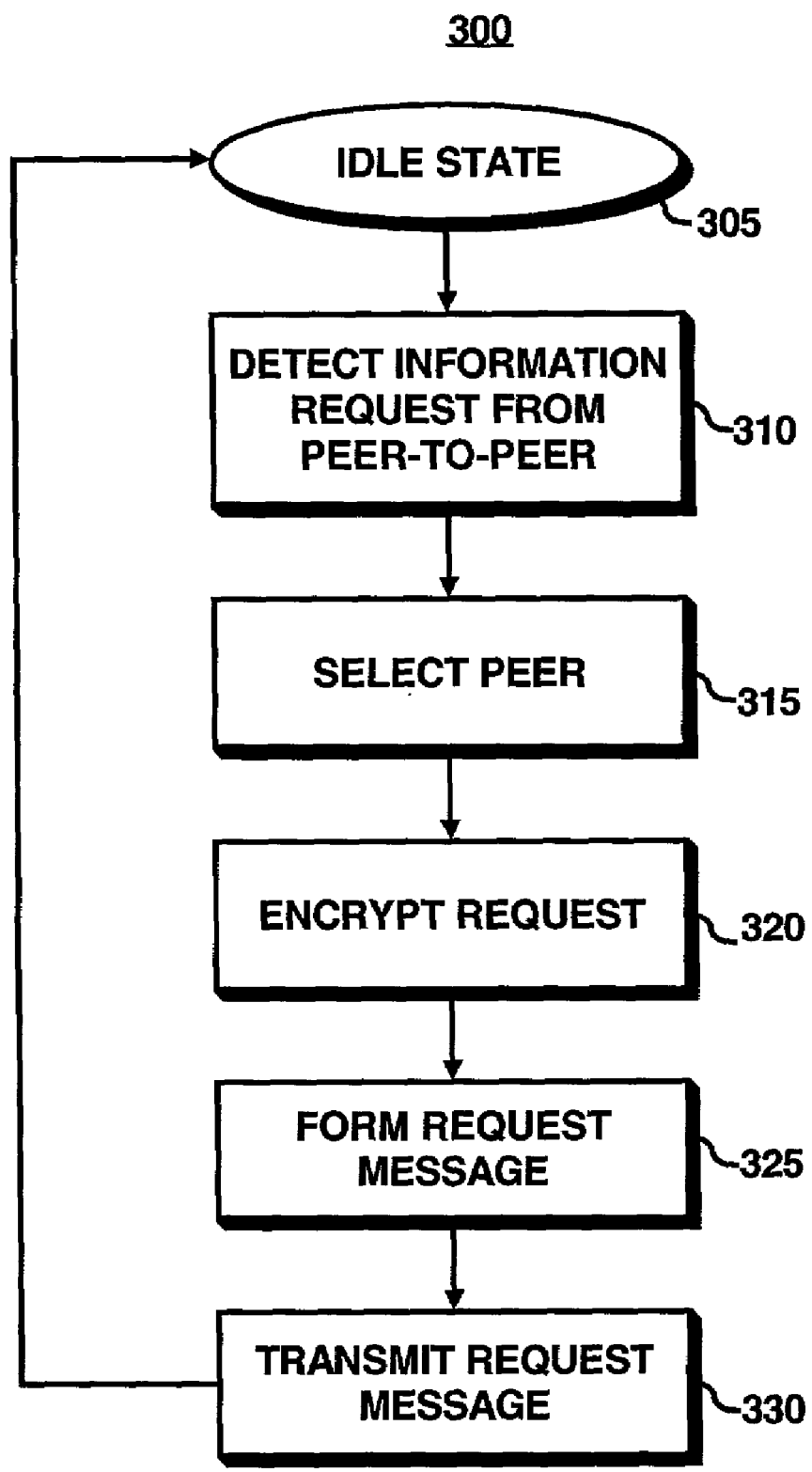
FIG. 3 illustrates an exemplary flow diagram according to another embodiment of the invention.

FIG. 3 illustrates an exemplary flow diagram of an operational mode 300 of the peer privacy module 220 shown in FIG. 2. It should be readily apparent to those of ordinary skill in the art that the operational mode 300 of the peer privacy module 220 represents a generalized illustration and that other steps may be added or existing steps may be removed or modified without departing from the spirit or scope of the present invention.

As shown in FIG. 3, the peer privacy module 220 may be configured to be in an idle state in step 305. In step 310, the peer privacy module 220 may detect a request for information from the peer-to-peer module 210. Alternatively, the operational mode 300 may be invoked upon detection of the request as a function call, by a command, a signal or other similar procedure.

In step 315, the peer privacy module 220 may be configured to select a peer from the plurality of peers 110a ... 110n as an intermediary peer. In step 320, the peer privacy module 220 may use the public key of the selected intermediary peer to encrypt the request for information, thereby increasing the privacy of the transaction.

In step 325, the peer privacy module 220 may be configured to form (or instantiate) a request message. The request message may take the form of $\{r, p_i\}$, where $p_i$ may be the identity of the requesting peer.

In step 330, the peer privacy module 220 may be configured to transmit the request message to the selected intermediary peer. Subsequently, the peer privacy module 220 may return to the idle state of step 305. Alternatively, the peer privacy module 220 may terminate the operational mode 300.

Figure 4B:
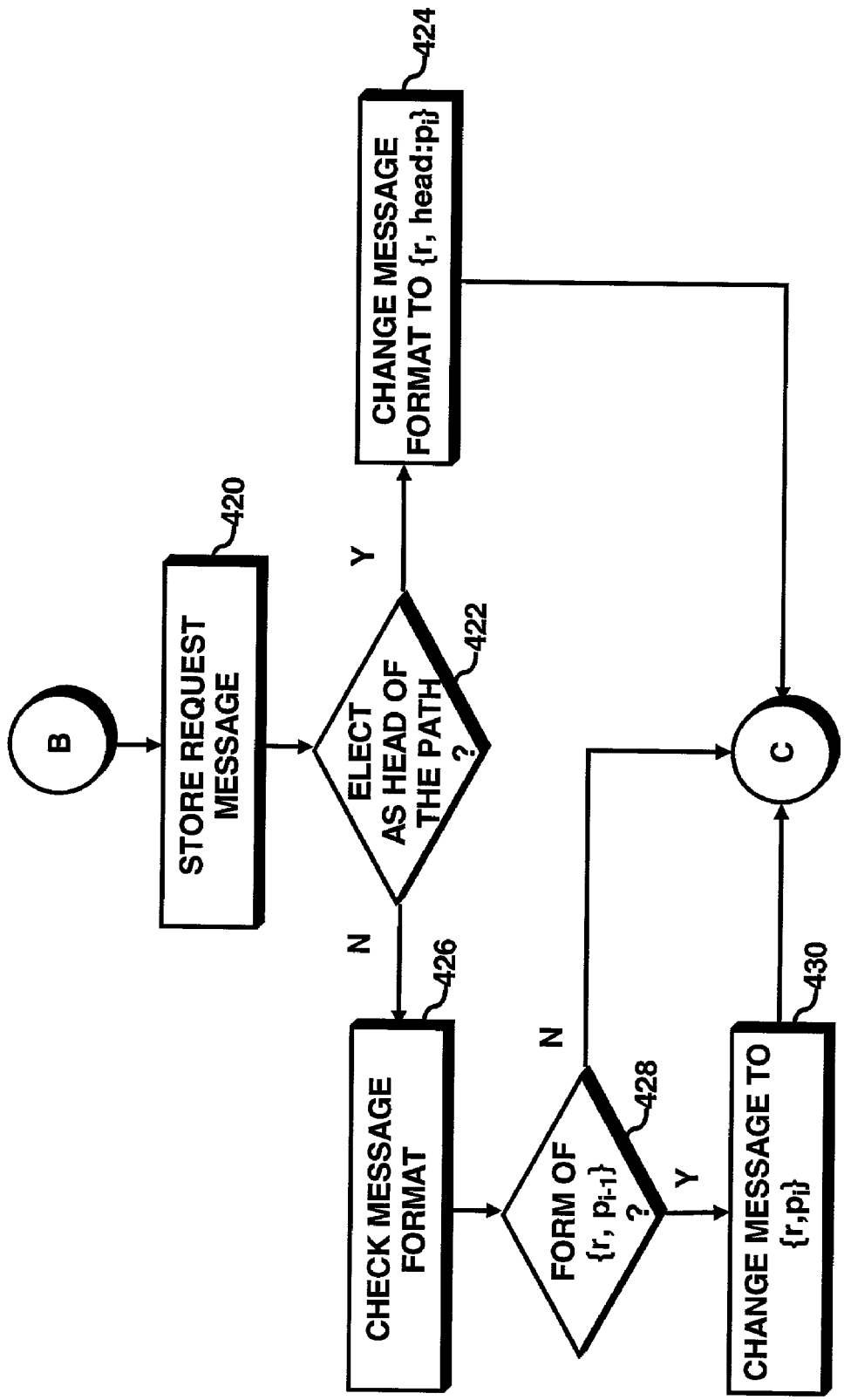
Figure 4C:
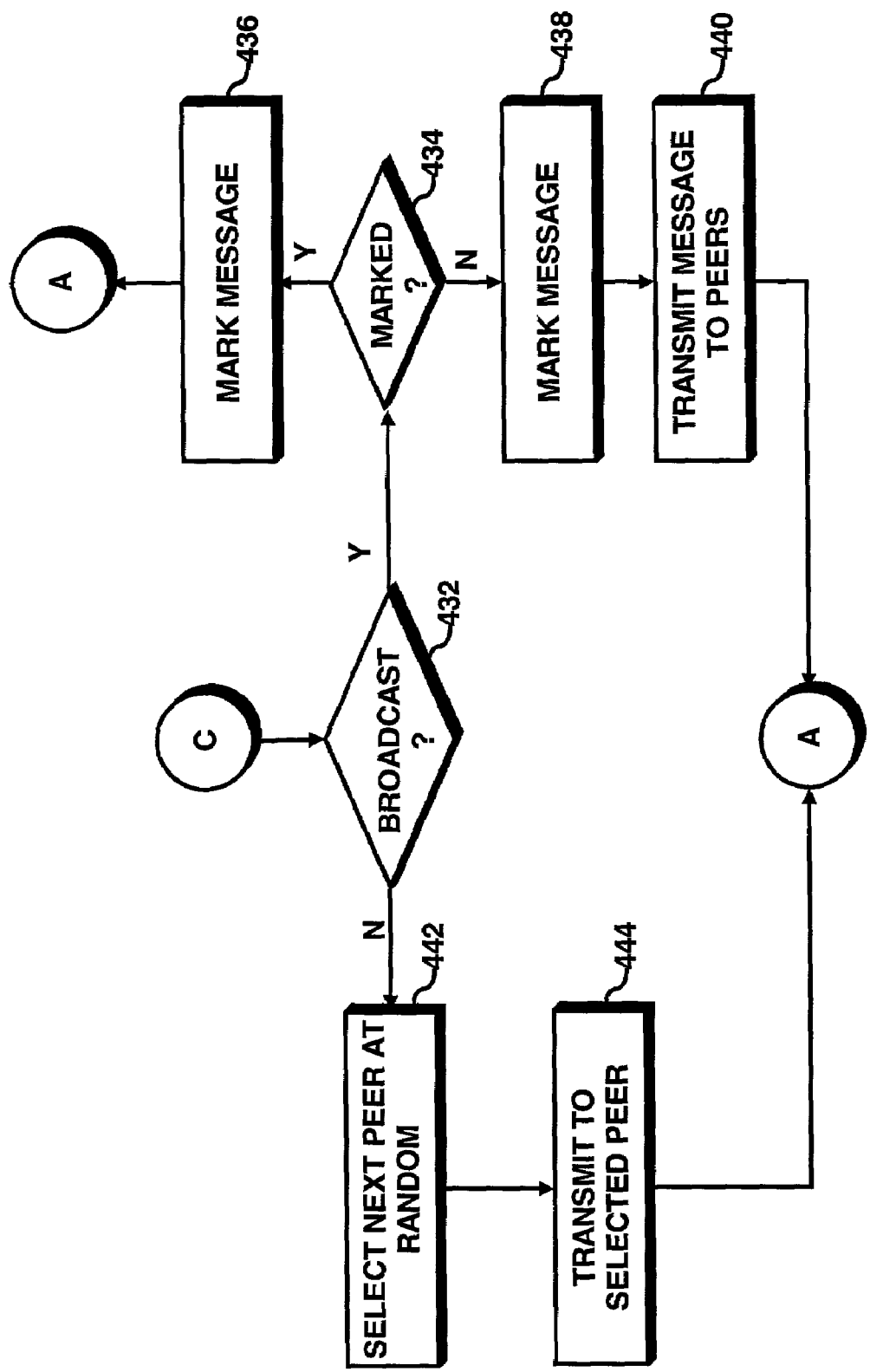

FIGS. 4A–C collectively illustrate an exemplary flow diagram of another operational mode 400 for the peer privacy module 220 shown in FIG. 2 in accordance with yet another embodiment of the present invention. It should be readily apparent to those of ordinary skill in the art that this operational mode of the peer privacy module 220 represents a generalized illustration and that other steps may be added or existing steps may be removed or modified without departing from the spirit or scope of the present invention.

As shown in FIG. 4A, the peer privacy module 220 may be configured to be in an idle state in step 402. The peer privacy module 220 may monitor the network interface 250 via the operating system 240 (shown in FIG. 2) for any received messages.

In step 404, the peer privacy module 220 may detect an incoming message received through the network interface 250. The peer privacy module 220 may be configured to temporarily store the set-up message for processing. Alternatively, the peer privacy module 220 may be invoked by a function call, a command, a signal, etc., in response to the detection of the incoming message.

In step 406, the peer privacy module 220 may be configured to determine whether the incoming message is a request message or a retrieval message. In particular, the peer privacy module 220 may compare the format of the incoming message with the formats associated with the request message and/or retrieval messages. Alternatively, a bit may be set to indicate the message type.

If the peer privacy module 220 determines that the incoming message is a retrieval message, the peer privacy module 220 may be configured to compare the received message with any previously stored request messages, in step 408, where the previously saved request messages may be stored in the memory 225. The retrieval message may contain the requested information.

The peer privacy module 220 may determine whether the received retrieval message matches any of the previously saved request messages, in step 410. If a match exists, the peer privacy module 220 may forward the retrieval message to the peer identified in the matching previously stored request message, in step 412. Subsequently, the peer privacy module 220 may return to the idle state of step 402. Alternatively, the peer privacy module 220 may terminate the operational mode 400. Otherwise, if the peer privacy module 220 determines that no existing previously stored request message matches the received retrieval message, the peer privacy module 220 may discard the retrieval message, in step 414. Subsequently, the peer privacy module 220 may return to the idle state of step 402.

Returning to step 406, if the peer privacy module 220 determines that the incoming message is in the form of a request message, the peer privacy module 220 may be configured to determine whether the requested information is stored in the memory 225, in step 416. If the information is stored in the memory 225, the peer privacy module 220 may be configured to transmit the requested information to the peer identified in the received request message, in step 418. Subsequently, the peer privacy module 220 may return to the idle state of step 402.

Referring to FIG. 4B, if the peer privacy module 220 determines that the information is not stored in the memory 225, the peer privacy module 220 may store the received request message, in step 420. The peer privacy module 220 may store received request message in an area allocated by the peer privacy module 220 in the memory 225.

In step 422, the peer privacy module 220 may be configured to determine whether to elect itself as a head of a return path for the requested information. More specifically, the peer privacy module 220 may decide to become the head of the return path based on a shortcut probability, pv. The shortcut probability, pv, may be used to control the length of the returning path, i.e., the number of peers from a last peer who elected to become head of the path to the requesting peer. The peer privacy module may generate a random number and compare the random number with a predetermined value of the shortcut probability, pv. If the random number is less than or equal to the shortcut probability, pv, then the peer privacy module 220 elects the current peer as head of the return path.

Selecting a suitable shortcut probability, pv, may be subtle. For example, the shortcut probability, pv, may be varied based on whether an earlier peer has elected itself to become head of the return path or not. The shortcut probability, pv, may be used to control the length, i.e., number of peers, from the last peer that elected to become head of the return path to the requesting peer. More specifically, the larger the value of the shortcut probability, pv, the shorter the distance since it is likely that a current peer would elect to become head of the return path.

The predetermined shortcut probability, pv, may be reduced to reduce the length of the returning path, if another peer has already elected itself to become a head of the return path. The reduced shortcut probability may be referred to as pv2. The reduced shortcut probability, pv2, may control the number of other volunteers after a peer has elected itself head. The smaller the value of the reduced shortcut probability, pv2, the less the number of other volunteers, hence the overall length of the returning paths.

If the peer privacy module 220 does elect to become the head of the return path, the peer privacy module 220 may modify the request message to include an indication that the receiving peer is the head of the return path, in step 424. For example, the peer privacy module 220 may set a bit or field in the request message such as $\{r, head:p_i\}$ to indicate that it is the head of the return path. Subsequently, the peer privacy module 220 may be directed to the processing of step 432, which is discussed in greater detail herein below.

If the peer privacy module 220 elects not to become the head of the return path, the peer privacy module 220 may check the format of the request message in step 426. If the request message is not in the form that indicates that another intermediary peer transmitted the request message, i.e., $\{r, p_{i-1}\}$, the peer privacy module 220 may be directed to the processing of step 432. In other words, the received request message has an indication that another peer has elected to become the head of the return path.

If the request message is in a form indicating that another intermediary peer transmitted the request message (i.e., $\{r, p_i\}$), the peer privacy module 220 may modify the received request message to indicate that the receiving peer is part of the return path for the requested information, i.e., $\{r, p_i\}$, in step 430.

With reference to FIG. 4C, in step 432, the peer privacy module 220 may be configured to determine whether to broadcast the request message or to transmit the request message to another intermediary peer. If the peer privacy module 220 elects to broadcast the request message, the peer privacy module 220 may be configured to determine if the request message has been marked for non-transmission, in step 434. If the request message has been marked, the peer privacy module 220 may discard the request message, in step 436. Subsequently, the peer privacy module 220 may be configured to return to the idle state of step 402.

Otherwise, if the request message is not marked, the peer privacy module 220 may be configured to mark the request message to prevent retransmission by other peers, in step 438. The peer privacy module 220 may then transmit the request message to the peers, in step 440. Subsequently, the peer privacy module 220 may return to the idle state of step 402.

Returning to step 432, if the peer privacy module 220 elects to transmit to another intermediary peer, the peer privacy module 220 may select a next intermediary peer at random in step 442. The peer privacy module 220 may then transmit the request message to the selected intermediary peer, in step 444. Subsequently, the peer privacy module 220 may return to the processing of step 402.

Figure 5:
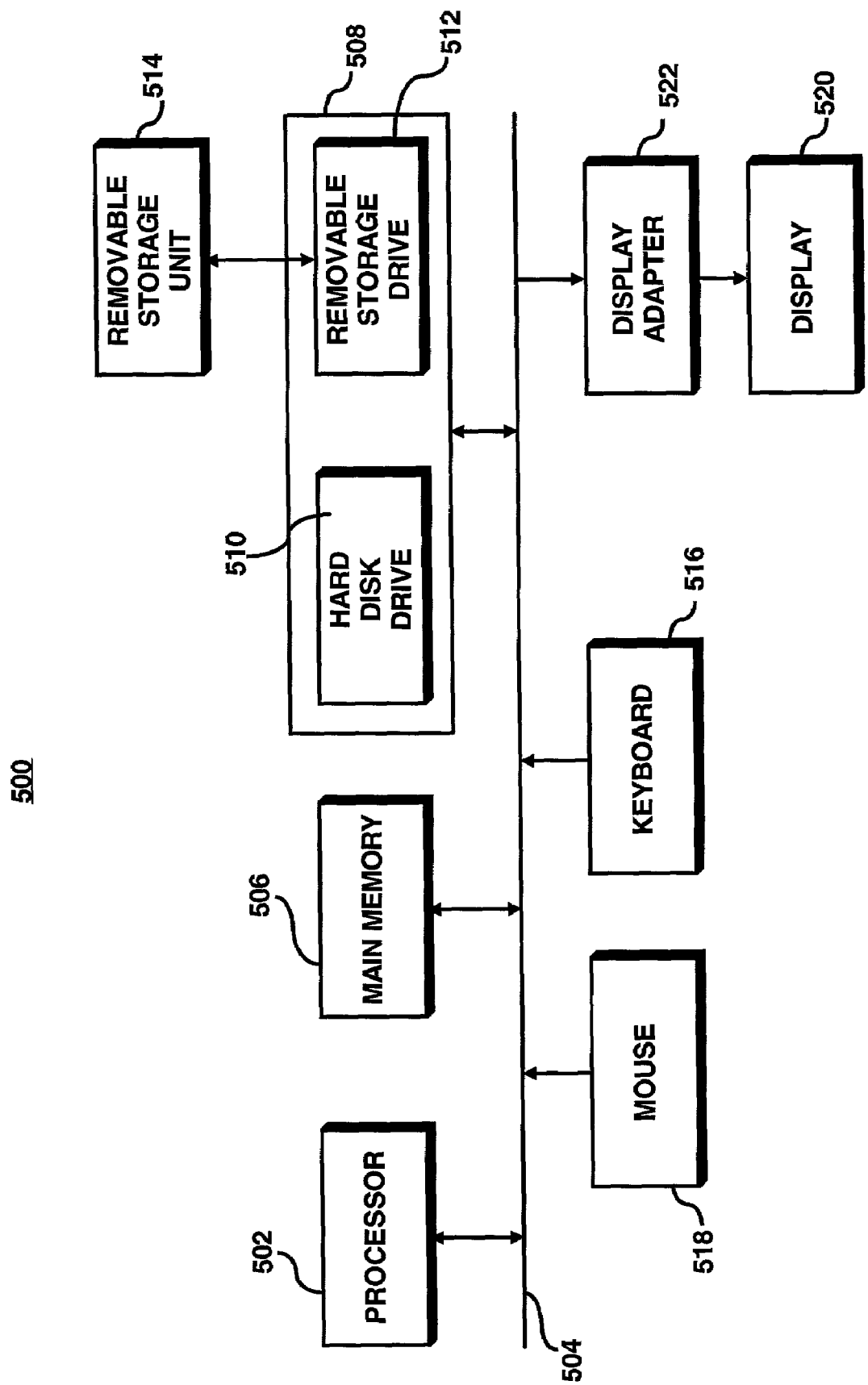
FIG. 5 illustrates an exemplary computer system where an embodiment of the present invention may be practiced.

FIG. 5 illustrates an exemplary block diagram of a computer system 500 where an embodiment of the present invention may be practiced. The functions of the peer privacy module 220 may be implemented in program code and executed by the computer system 500. The peer privacy module may be implemented in computer languages such as PASCAL, C, C++, JAVA, etc.

As shown in FIG. 5, the computer system 500 includes one or more processors, such as processor 502, that provide an execution platform for embodiments of the peer privacy module. Commands and data from the processor 502 are communicated over a communication bus 504. The computer system 500 also includes a main memory 506, such as a Random Access Memory (RAM), where the software for the peer privacy module may be executed during runtime, and a secondary memory 508. The secondary memory 508 includes, for example, a hard disk drive 510 and/or a removable storage drive 512, representing a floppy diskette drive, a magnetic tape drive, a compact disk drive, etc., where a copy of a computer program embodiment for the peer privacy module may be stored. The removable storage drive 512 may read from and/or write to a removable storage unit 514 in a well-known manner. A user interfaces with the peer privacy module with a keyboard 516, a mouse 518, and a display 520. A display adaptor 522 interfaces with the communication bus 504 and the display 520 and receives display data from the processor 502 and converts the display data into display commands for the display 520.

Certain embodiments of the present invention may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

What is claimed is:

1. A method of invoking mutual anonymity, said method comprising:
   determining whether to become a head of return path in response to receiving a request for information and based on a shortcut probability used to control a length of the return path;
   electing to become the head of the return path;
   receiving said information at said head of said return path; and
   forwarding said information to a peer that transmitted said request.

2. The method according to claim 1, further comprising: encrypting said request.

3. The method according to claim 1, further comprising: reformatting said request message to include an indication of being said head of said return path.

4. The method according to claim 3, further comprising: selecting a next peer from a plurality of peers; and
   transmitting said reformatted request message to said next peer.

5. The method according to claim 3, further comprising: marking said reformatted request message; and
   transmitting said reformatted request message, wherein said marking prevents retransmission of said reformatted request message.

6. The method according to claim 1, further comprising: receiving an incoming message;
   determining a message type for said incoming message; and
   comparing said incoming message with previously stored request messages in response to said message type being a retrieval message type.

7. The method according to claim 6, further comprising: discarding said incoming message in response to said incoming message not matching with any one of said previously stored request messages.

8. The method according to claim 6, further comprising: matching said incoming message with one of said previously stored request messages;

identifying a returning peer from said one of said previously stored request messages; and
forwarding said incoming message to said returning peer.

9. The method according to claim 1, further comprising:
receiving an incoming message;
determining a message type for said incoming message; and
searching for said information in response to said message typo being a request message type.

10. The method according to claim 9, further comprising:
transmitting said information to a requestor peer, said requestor peer configured to transmit said request message, in response to said information being located.

11. The method according to claim 9, further comprising:
storing said request message in response to said information not being located.

12. A method of increasing privacy, said method comprising:
forwarding a request for information among a plurality of peers;
selecting multiple peers from said plurality of peers as heads of a return path based on a shortcut probability used to control a length of the return path, whereby the shortcut probability is varied based on whether an earlier peer has elected itself to become head of the return path; and
forwarding said information to said multiple peers from another peer containing said information.

13. The method according to claim 12, further comprising:
receiving an incoming message;
determining a message type for said message; and
comparing said incoming message with previously stored requests in response to said message type being a retrieval message type.

14. The method according to claim 13, further comprising:
discarding said incoming message in response to said incoming message not matching with any of said previously stored requests.

15. The method according to claim 13, further comprising:
determining an identified peer from one of said previously stored requests in response to said incoming message matching a previously stored request; and
forwarding said incoming message to said identified peer.

16. The method according to claim 13, further comprising:
storing said incoming message in response to said incoming message not matching any one of said previously stored requests.

17. The method according to claim 13, further comprising:
reformatting said request to include an indication of a status of a peer being one of said heads of said return path.

18. The method according to claim 17, further comprising:
marking said reformatted request; and
broadcasting said reformatted request to said plurality of peers.

19. The method according to claim 17 further comprising:
selecting a next peer, and
transmitting said reformatted request to said next peer.

20. The method according to claim 15, further comprising:
determining a message format of said request; and
reformatting said request to indicate a change in status of a requesting peer.

21. The method according to claim 20, further comprising:
marking said reformatted request; and
broadcasting said reformatted request to said plurality of peers.

22. The method according to claim 20, further comprising:
selecting a next peer; and
transmitting said reformatted request to said next peer.

23. An apparatus for increasing privacy, said apparatus comprising:
means for forwarding a request for information among a plurality of peers;
means for selecting multiple peers from said plurality of peers as heads of a return path based on a shortcut probability used to control a length of the return path, whereby the shortcut probability is varied based on whether an earlier peer has elected itself to become head of the return path; and means for forwarding said information to said multiple peers from another peer containing said information.

24. The apparatus according to claim 23, further comprising:
means for receiving an incoming message;
means for determining a message type for said message; and
means for comparing said incoming message with previously stored requests in response to said message type being a retrieval message type.

25. The apparatus according to claim 24, further comprising:
means for discarding said incoming message in response to said incoming message not matching with previously stored requests.

26. The apparatus according to claim 24, further comprising:
means for determining an identified peer from one of said previously stored requests; and
means for forwarding said incoming message to said identified peer.

27. The apparatus according to claim 24, further comprising:
means for storing said incoming message in response to said incoming message not matching any one of said previously stored requests.

28. The apparatus according to claim 23, further comprising:
means for reformatting said request to include an indication of a status of being one of said heads of said return path.

29. The apparatus according to claim 28, further comprising:
means for marking said reformatted request; and
means for broadcasting said reformatted request to said plurality of peers.

30. The apparatus according to claim 28, further comprising:
means for selecting a next peer; and
means for transmitting said reformatted request to said next peer.

31. The apparatus according to claim 26, further comprising:
means for determining a message format of said request; and means for reformatting said request to indicate a change in status of a requesting peer.

32. The apparatus according to claim 31, further comprising:
means for marking said reformatted request; and
means for broadcasting said reformatted request to said plurality of peers.

33. The apparatus according to claim 31, further comprising:
means for selecting a next peer; and
means for transmitting said reformatted request to said next peer.

34. A system for invoicing mutual anonymity, said system comprising:
a network;
a plurality of peers; and
a peer privacy module configured to be stared and executed on each peer of said plurality of peers, wherein said peer privacy module is configured to forward a request for information among a plurality of peers through said network, to select multiple peer from said plurality of peers as heads of a return path based on a shortcut probability used to control a length of the return path, whereby the shortcut probability is varied based on whether an earlier peer has elected itself to become head of the return path, and to forward said information to said peer from another peer containing said information.

35. The system according to claim 34, further comprising:
a network interface configured to interface with said network on each peer of said plurality of peers, wherein said peer privacy module is configured to receive an incoming message from said network though said network interface, to determine a message type for said message, and to compare said incoming message with previously stored requests in response to said message type being a retrieval message type.

36. The system according to claim 35, wherein said peer privacy module is configured to discard said incoming message in response to said incoming message not matching with previously stored requests.

37. The system according to claim 35, wherein said peer privacy module is further configured to determine an identified peer from one of said previously stored requests and to forward said incoming message to said identified peer.

38. The system according to claim 35, further comprising:
a memory configured to store and access data and to interface with said peer privacy module on each peer of said plurality of peers, wherein said peer privacy module is further configured to store said incoming message in said memory in response to said incoming message not matching any said previously stored requests.

39. The system according to claim 38, wherein said peer privacy module is further configured to elect to become one of the heads of the return path for said information and to reformat said request to indicate the one of the heads of the return path.

40. The system according to claim 39, wherein said peer privacy module is further configured to mark said reformatted request and to broadcast said reformatted request through said network interface to said plurality of peers over said network.

41. The system according to claim 40, wherein said peer privacy module is further configured to select a next peer and to transmit said reformatted request through said network interface to said next peer over said network and the next peer is configured to determine whether the received reformatted request was forwarded from an intermediary node and configured to discard the request if the request was not forwarded from an intermediary node.

42. The system according to claim 37, wherein said peer privacy module is further configured to determine a message format of said request and to reformat said request to indicate a change in status of a requesting peer.

43. The system according to claim 42, wherein said peer privacy module is further configured to mark said reformatted request and to broadcast said reformatted request through said network interface to said plurality of peers over said network.

44. The system according to claim 42, wherein said peer privacy module is further configured to select a next peer and to transmit said reformatted request through said network interface to said next peer over said network.

45. The method of claim 1, wherein the shortcut probability is varied based on whether an earlier peer has elected itself to become a head of the return path.

* * * * *

UNITED STATES PATENT AND TRADEMARK OFFICE
CERTIFICATE OF CORRECTION

| | | |
|---|---|---|
| PATENT NO. | : 7,167,979 B2 | Page 1 of 1 |
| APPLICATION NO. | : 10/114071 | |
| DATED | : January 23, 2007 | |
| INVENTOR(S) | : Zhichen Xu et al. | |

It is certified that error appears in the above-identified patent and that said Letters Patent is hereby corrected as shown below:

In column 10, line 30, in Claim 1, after "head of" insert -- a --.

In column 11, line 9, in Claim 9, delete "typo" and insert -- type --, therefor.

In column 11, line 62, in Claim 19, after "claim 17" insert -- , --.

In column 11, line 63, in Claim 19, delete "peer," and insert -- peer; --, therefor.

In column 13, line 13, in Claim 34, delete "invoicing" and insert -- invoking --, therefor.

In column 13, line 17, in Claim 34, delete "stared" and insert -- stored --, therefor.

In column 13, line 33, in Claim 35, delete "though" and insert -- through --, therefor.

Signed and Sealed this

Thirteenth Day of January, 2009

JON W. DUDAS
*Director of the United States Patent and Trademark Office*